July 7, 1931. F. H. LEE 1,813,860
COMPOSITE FABRIC AND METHOD OF MAKING THE SAME
Filed March 12, 1931   2 Sheets-Sheet 1

Frank H. Lee
INVENTOR

BY Janney, Blair & Curtis
ATTORNEYS

July 7, 1931.    F. H. LEE    1,813,860
COMPOSITE FABRIC AND METHOD OF MAKING THE SAME
Filed March 12, 1931    2 Sheets-Sheet 2
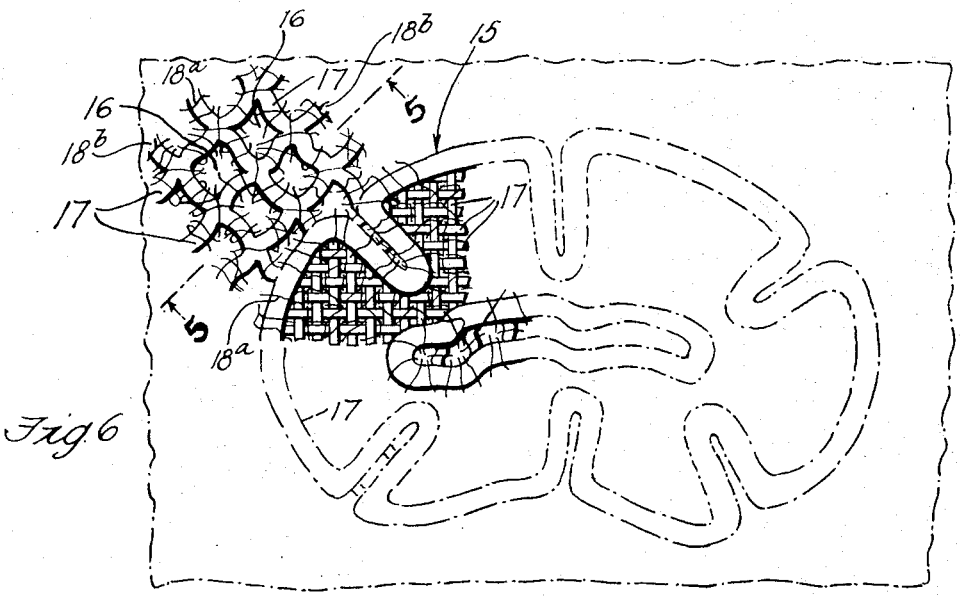
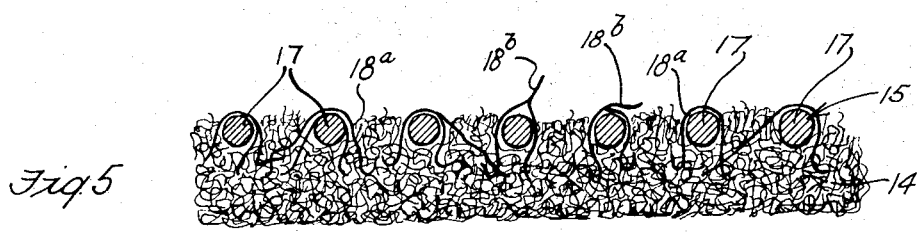
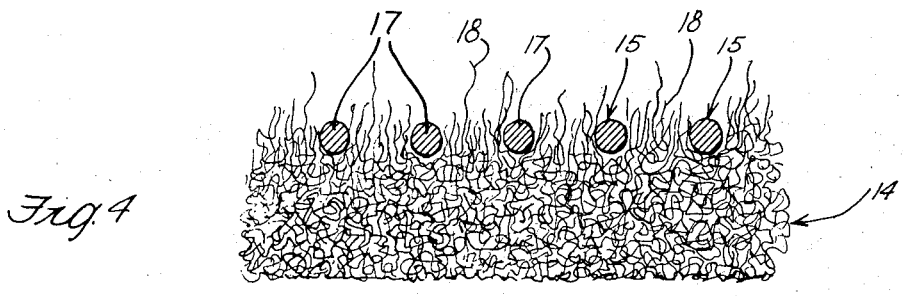
Frank H. Lee
INVENTOR
BY Janney, Blair & Curtis
ATTORNEYS Patented July 7, 1931

1,813,860

UNITED STATES PATENT OFFICE

FRANK H. LEE, OF DANBURY, CONNECTICUT

COMPOSITE FABRIC AND METHOD OF MAKING THE SAME

Application filed March 12, 1931. Serial No. 522,125.

This invention relates to fabrics and to the art of making the same.

One of the objects of this invention is to provide a method of making a fabric that may be readily and inexpensively carried on in practice and with thoroughly dependable and efficient results. Another object is to provide a practical and efficient method for producing a fabric that will be of durable and lasting quality and capable of a wide variety of uses. Another object is to provide a practical and dependable method of making a combined or composite fabric, thus to achieve not only advantages inherent in the component parts of the fabric but also advantages not inherent in either. Another object is to provide a practicable method for effectively combining a felt, such as wool or fur felt, with a material made up of thread, yarn, or the like, woven, knitted, or otherwise looped together. Another object is to provide a method of the above-mentioned character for ornamenting felt.

Another object is to provide a strong, rugged and inexpensive composite fabric that will be well adapted to meet a wide variety of uses in the practical art. Another object is to provide a dependable and rugged composite fabric that readily and inexpensively lends itself to a wide variety of ornamentation. Another object is to provide a practical and inexpensive composite fabric of felt and a woven or knitted material, or the like. Another object is to provide a composite felt and non-felt fabric that will be durable, strong, and of good quality. Another object is to provide a fabric in which a wide variety of color contrasts or color schemes may be dependably and inexpensively achieved. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which are shown several of the various possible embodiments of certain mechanical features of this invention, Figure 1 is a diagrammatic representation of a certain step of my process;

Figure 2 is a similar diagrammatic representation of a step in a possible modified form of my process;

Figure 3 indicates diagrammatically a possible form of apparatus for carrying out certain later steps of my process;

Figure 4 is a fragmentary cross-sectional view on an exaggerated scale of the fabric in one stage of my process;

Figure 5 is a cross-sectional view on an exaggerated scale of the finished product or fabric, and Figure 6 is a plan view on a smaller scale of a portion of the fabric resulting from my process.

Similar reference characters refer to similar parts throughout the several views in the drawings.

In carrying out my process, I prefer to form first a felt base which may be made up either fur or wool, for example, and as illustrative of a preferred practical embodiment of my process, I shall first describe the same in connection with the use of fur fibers to make up the felt base. Starting with suitable fur fibers, preferably fur fibers that have already been "carroted" or suitably treated to give them good felting or interlocking qualities, I first cause such fur fibers to be deposited on a suitable surface and preferably in a layer of suitable and uniform thickness.

Figure 1:
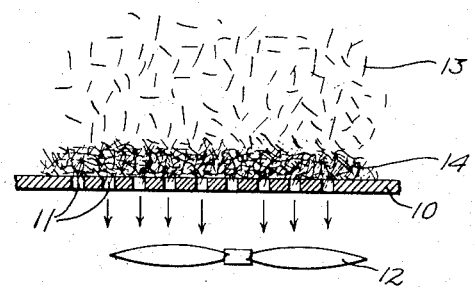

To achieve such a deposit of fur fibers I prefer to employ a suitable suction apparatus which, referring now to Figure 1 of the drawings, may include a suitable perforated surface 10 made, for example, of sheet metal having a relatively large number of closely spaced small openings 11 through which a draft of air in a downward direction is produced by any suitable means, for example, by a fan 12. By any suitable apparatus, as for example by means of rapidly revolving picker rolls, I cause the fur fibers, indicated in Figure 1 at 13, to be cast or showered into the region of the downwardly moving air current, whence they are caught by the air current, moved downwardly, and uniformly deposited upon the perforated member 10.

Preferably the apparatus diagrammatically indicated in Figure 1 is enclosed in a suitable chamber (not shown).

After a layer of felt fibers, indicated in Figure 1 at 14, of sufficient thickness has been achieved, the layer of felt fibers is removed from the member 10, conveniently, if desired, with the aid of suitable cloths. The layer-like mass of fur fibers, hereinafter termed for convenience the "felt base", is now worked in order to bring about what may be termed an incomplete or loose interlocking or interfelting of the fur fibers one with the other, mainly to give the felt base sufficient mechanical strength to withstand subsequent steps in the process. This working may include a gentle kneading preferably under the influence of hot water.

Thereupon, the sheet-like felt base has placed upon it or flatwise related to it on a portion or the whole of its surface the material generally indicated in the drawings (see Figure 6) at 15 and illustratively taking the form of layers made up into any desired figure or ornamentation. In Figure 4 is shown in exaggerated fragmentary cross-section the felt base 14, thus hardened or partially hardened, with the material 15 related to it.

The material 15 may be woven, knitted or otherwise constructed of interengaged or interlooped threads or yarn, the fibers of which may be of any suitable material, either silk or rayon, for example. Such fibers are substantially devoid of felting properties and are substantially non-feltable, but the threads which they go to make up lend themselves to the production by weaving, knitting, or the like, of ornamentation, designs, or the like, of which felt per se is incapable. Moreover, as will be pointed out more clearly hereinafter, the material 15, for example, of cotton, linen, silk, rayon, or the like, has inherently or may be given the property of reacting to the same dye in quite a different manner from the felt base, thus making it possible, according to my process, to achieve color contrasts of which either material alone is incapable. The material 15 is of open-work construction or loosely enough woven to provide adequate interstices between the threads thereof and a layer, such as is illustratively shown on enlarged scale in Figure 6, is a good example of this construction.

As above pointed out, the material 15 and the hardened or partially hardened felt base 14 are related flatwise to each other as by laying one against the other, the parts assuming the relation shown in exaggerated cross-section in Figure 4. Figure 4 may be considered to be a section along the line 4—4 of Figure 6, and in Figure 6 certain of the interstices in the material 15 are shown at 16, being thus formed between the threads or yarn 17 of which the material 15 is made. Through these interstices 16, when the materials 14 and 15 are related to each other as above pointed out, certain of the feltable fibers of the felt base 14 project; these projecting fibers are shown in Figure 4 at 18 and they project through the interstices between the threads 17 of the material 15. These feltable fibers may be of varying lengths, some of them being as long as one-half or three-quarters of an inch, and the projecting fibers 18 have their anchored ends interlocked or interfelted with the interfelted fibers within the felt base 14.

Thereupon, the thus far assembled materials 14 and 15 (Figure 4) are subjected to a vibratory treatment under pressure, the nature and action of which may be better understood by considering a possible form of apparatus which may be used for this purpose though it is to be understood that the treatment may be carried out by hand or by any other apparatus. Hence, referring now to Figure 3, I provide a suitable table or support 19, preferably flat, with which coacts the flat or plate-like member 20 suitably supported above the member 19 so as to permit variations of the distance between the two parts and also to permit of an oscillating or reciprocating movement of the member 20 in its own plane.

Between the members 19 and 20 I place the thus far assembled materials 14—15 (see Figure 4) but, since I may subject more than one such assembled materials to this treatment at the same time, I may superimpose one upon the other any suitable number of felt bases 14 with the material 15 related thereto, as is shown in Figure 4.

Figure 3:
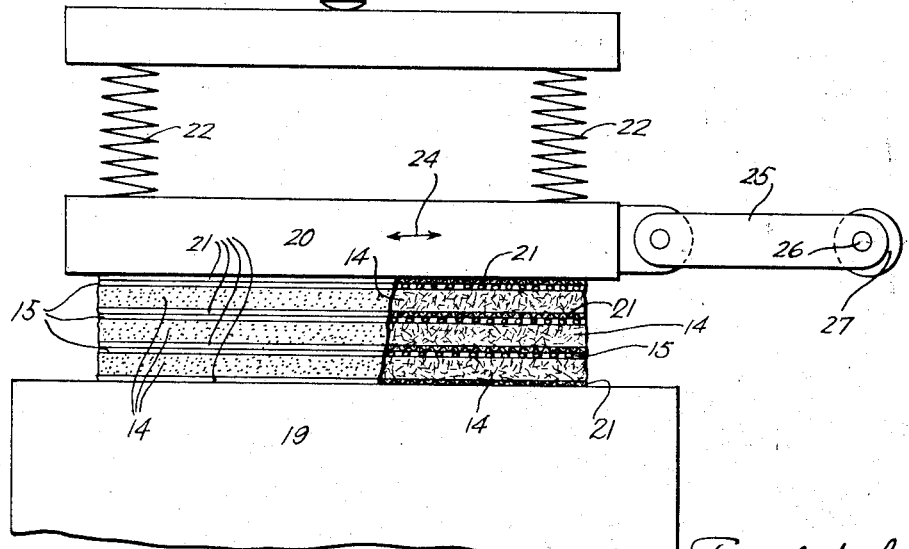

In Figure 3 I have shown three such materials 14—15 interposed between the members 19 and 20, but these assembled materials 14—15 are separated from adjacent and like assembled materials by suitable cloths indicated in Figure 3 at 21. Preferably, also, cloths 21 are interposed between the two members 19 and 20 and the interposed materials.

Thus, in Figure 3, a cloth 21 preferably of cotton sheeting rests upon the support 19, then comes a felt base 14 with the material 15 related to it, as in Figure 4, next a cloth 21, then a felt base 14 with the material 15, and so on. Member 20 is pressed downwardly toward the member 19, by any suitable means, such as springs 22, and preferably the downward pressure which the member 20 exerts upon the materials interposed between it and member 19 is variable or adjustable as by means of a suitable adjusting screw 23 through which the pressure exerted by the springs 22 may be predetermined at will.

Member 20 is given a reciprocating or vibrating motion in its own plane, preferably as indicated by the arrow 24 in Figure 3, and this motion may be communicated to member 20 by any suitable means, such as a connecting rod 25 acted upon by a crank pin 26, the throw of which, and hence the stroke of movement of member 20, may be adjusted if desired, driven from any suitable crank shaft or like driving member indicated at 27. I get good results with a throw of about one-eighth of an inch.

Before inserting the parts 14—15 into this apparatus, they are thoroughly steamed so that sufficient moisture and heat penetrates to the feltable fibers in the felt base 14, and when the combined pressure and vibrating treating thereupon proceeds, the feltable fibers, theretofore more or less completely interlocked or interfelted (as is indicated in Figure 4) are progressively more and more tightly interfelted as the treatment proceeds. But, at the same time, the fibers 18 (referring now to Figure 4) that project through the interstices in the material 15 are laid over, many of them being laid over the threads 17, while the latter are to some extent forced downwardly into the felt base. This pressing of the threads 17 into the felt base 14 has the effect of bringing more fibers up through interstices and also of raising somewhat portions of the felt base itself into at least the larger interstice. Thus, more fibers are brought out upwardly of the threads 17 and laid over the latter and as this treatment continues, the free ends of these fibers, the other ends of which are being more and more securely interfelted with the fibers of the felt base 14, are being forced into interfelting connection with feltable fibers or the felt base on the other side of the threads 17. Thus, these projecting fibers 18 (Figure 4) and particularly the longer of the projecting fibers, are made to loop over the threads 17 of the material 15 and to be securely anchored or interfelted at both ends into or with the felt base 14, in effect securing or tying the material 15 substantially uniformly throughout its extent to the base 14.

As the above actions continue, the feltable fibers of the felt base 14 are being more and more tightly interfelted and the base itself is being compacted, being in effect reduced in thickness. Such compacting or tightening of the feltable fibers of the base 14 acts more securely to anchor or interfelt the ends of the fibers 18 (Figure 4) which loop over the threads 17 and secure the material 15 in place.

In Figure 5, to which further reference will be made hereinafter, I have shown on a similarly exaggerated scale how certain of the fibers 18 of Figure 4 loop over the threads 17 of the material 15 and tie the latter to the base 14; more specifically, such looping fibers are indicated in Figure 5 at 18ª. Certain of the fibers 18 (Figure 4) may, however, be too short to partake of this complete looping or tying action and certain of the shorter fibers and possibly also some of the longer fibers become interlocked or felted together at their free ends; thus, in Figure 5, I have shown in an exaggerated way how fibers 18ᵇ, anchored in the base 14, are interfelted or interengaged at their free ends and together form a loop for tying a thread 17 of the material 15 down to the base 14. These actions are greatly facilitated by the transverse vibratory treatment above described.

If the fur base has been initially only partially hardened, then the above-described vibratory treatment under pressure will have substantially completed the hardening of the fur base, thus bringing the feltable fibers into more securely interfelted relation.

At this point it may be noted that the degree of initial hardening may be and preferably is gaged by such factors as the character of the open-work or woven material employed (material 15) and also by the number of fur fibers which it is desired in the ultimate composite fabric to have looped over the threads of the material. For example, in this latter connection, I may wish, in the ultimate composite fabric, to bring out more or less clearly the material and hence the design of the part 15, particularly where the latter is lace and where, for example, I want to have that design stand out very prominently, the extent of initial hardening is greater than where I want the design to appear less prominently; in the former instance, the greater extent of hardening makes available a lesser number of fur fibers for tying action and in the latter instance the lesser extent of hardening makes available more fibers for tying the threads of the material down.

The materials are thereupon removed from the apparatus of Figure 3 and are preferably subjected to shrinking either by machine or by hand and in the course of which the composite fabric 14—15 either individually or in groups of several with suitable cloths interposed therebetween are subjected to an appropriate kneading action accompanied by suitable applications of either steam or hot water or both, the felt base 14 being further compacted and completely tightening up and the looping action of the tying fibers also tightening up. During this further step it is probably also that additional fibers are brought into looping arrangement with the material 15. During this step, also, there is a shrinkage in the lateral dimensions of the material, due to the interfelting action above-described, but the material 15, due, for example, to its open-work character or construction, follows this shrinkage uniformly and does so without disfiguring any design which the material may have. On the contrary, the accompanying shrinkage of the material 15 reduces the size of the interstices between the threads thereof and this action aids in achieving the dependable securing of the material to the felt base.

In Figure 6 is shown on an exaggerated scale the completed fabric and I have there also indicated how the threads 17 of the material 15 are tied down by looped fibers felted at their ends into the felt base 14. In Figure 6 the material 15 is illustratively shown in the form of lace of fancy design, but it is to be understood that my invention is not limited to the use of a material of that character.

In any event, however, the open-work material 15 is dependably and securely fastened in place on the felt base 14 and is practically an integral part of the latter. In appearance both materials are plainly in evidence and the resultant fabric has not only the mechanical advantages of its two component parts but also, among other features, an appearance which cannot be achieved by either alone. Particularly where the material 15 is in the form of layers and hence is of an ornamental or decorative design, the not unusual highly ornamental configuration of the latter appears as a fine and delicate tracery on the background of the felt base.

According to my process, furthermore, I make it possible to achieve a wide variety of attractive or contrasting color schemes. For example, I may dye the material 15 any suitable color before its application to the felt base, the latter having any of the various possible available natural colors and thus achieve one range of contrasts. Or I may dye the material 15 before its application to the felt base as above described, giving it one shade or color, and then in any subsequent step or even upon the completion of the various steps above-described, dye the composite fabric with another color, this dyeing step causing different reactions in the fur base 14 from what it causes in the already dyed material 15.

Or, I may treat the material 15, before its application to the felt base 14, in any suitable way to resist to any desired extent the dye to which I may subject the composite fabric in any of the above-described steps of the process, thus achieving another range of possible color contrasts. Then again, I may, in any of the latter stages of my process, employ an acid dye for dyeing the composite fabric while utilizing in the material 15 a fiber, like rayon, that is resistant to acid dyes, and thus achieve another range of possible contrasts or color schemes; in the latter case, the material 15 may be pre-dyed or not, as desired.

Figure 2:
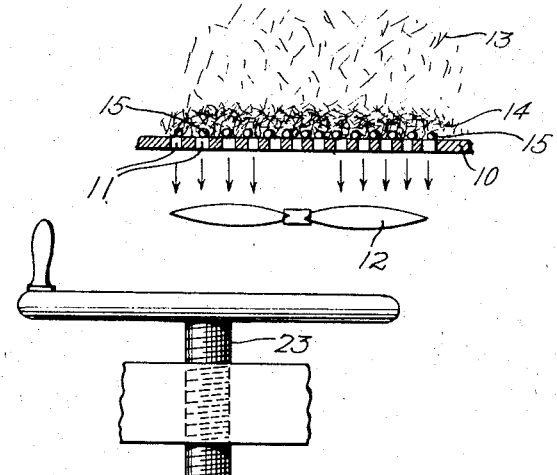

As merely illustrative of possible other ways of relating the feltable fibers with a material like the material 15 above-described, I may, referring now to Figure 2, place the open-work material 15 upon the perforated surface 10, the latter and related parts taking the form described above in connection with Figure 1, so as to cause the fan 12 to draw air downwardly through the interstices in the material 15 itself, thus to cause the fibers 13 (Figure 2) to be drawn downwardly and deposited directly upon the material 15 to form a layer 14. In such case, the projecting of certain of the fur fibers through the interstices in the material 15 is facilitated, the suction action aiding in tending to draw certain of the fibers into or through the interstices. The felt base 14, thus superimposed upon the material 15, is then preferably hardened preferably while these parts are still on the perforated member 10. Such hardening may be carried on also to an extent sufficient to insure the dependable removal of the materials 14 and 15 from the part 10 or the vibratory treatment under pressure may be carried on before removal of the parts from the member 10; in either case, the subsequent steps may proceed as already above-described.

After the completion of such steps as above described, it may, depending upon circumstances, be desirable to clip that side of the composite fabric upon which the open-work material 15 appears; for example, some of the feltable fibers may for one reason or another protrude or project upwardly having, for instance, not been felted back into the felt base and such protruding fibers can be sheared or clipped off.

Also, I prefer to iron or press, preferably under heat, the composite fabric, and for this purpose I may employ any suitable apparatus. Such pressing or ironing may be employed to smooth out the resultant sheet-like fabric and might also, if desired, be made to reduce the thickness of the ultimate material where some reduction in thickness may be desirable.

In view of the foregoing, the practice of my process I believe will now be clear, and though I have described the latter and the resultant composite fabric as including a felt base made of feltable fur fibers, it is to be understood, as already above pointed out, that I may employ wool; in the latter case the various steps above described in detail will suffice excepting that, instead of forming the layer or felt base in the manner described above in connection with Figures 1 and 2, the wool fibers are formed into a layer in any suitable manner and the fabric 15 thereupon related to it or the wool fibers may be formed into a layer of suitable thickness directly upon the fabric 15. For this purpose, the wool fibers from a carding machine may be laid or deposited, as immediately above described, by means of a so-called cross-forming machine.

It will thus be seen that there has been provided in this invention a composite fabric and a process for producing the same in which the various objects hereinabove noted, together with many thoroughly practical advantages, are successfully achieved.

Where, in the following claims, I refer to a "woven" material, I mean to include in that term any material made up of thread or yarn, or the like, interlooped, interlocked, or inter-engaged, whether woven, knitted, or otherwise formed into a sheet-like material.

As many possible embodiments may be made of the mechanical features of the above invention and as the art herein described might be varied in various parts, all without departing from the scope of the invention, it is to be understood that all matter hereinabove set forth or shown in the accompanying drawings, is to be interpreted as illustrative and not in a limiting sense.

I claim:

1. The herein described art which consists in forming a layer of feltable fibers, relating thereto a material made of threads having interstices therebetween, working certain of the feltable fibers through said interstices, felting the fibers of said layer together, and looping the fibers passing through said interstices over the threads of said material and felting the otherwise free ends thereof into the layer of felt.

2. The herein described art which consists in forming a layer of feltable fibers, relating thereto a material made of threads having interstices therebetween, felting the feltable fibers of said layer together, and felting the ends of fibers into the felt layer after looping the fibers over threads in said material.

3. The herein described art which consists in forming a layer of feltable fibers, relating thereto a material made of threads of non-feltable fibers with interstices between the threads, felting the feltable fibers of said layer together, and utilizing certain of said fibers to secure the threads of said material to the felt layer.

4. The herein described art which consists in relating flatwise to each other two sheet-like materials, one comprising a mass of feltable fibers and the other comprising woven threads of non-feltable fibers with interstices between threads; and working the thus-related materials to cause the feltable fibers of one to interfelt with each other and to cause certain of the feltable fibers to work through interstices in the second-mentioned material, to loop over the threads of the latter, and to interfelt with the feltable fibers of the first-mentioned material.

5. The herein described art which consists in superimposing one upon the other a layer of feltable fibers and an open-work material made up of threads, felting the feltable fibers together, and joining said material to the felted fibers by looping feltable fibers over the threads of said material and interfelting the ends of the looped fibers with said feltable fibers.

6. The herein described art which consists in forming a felt of feltable fibers and securing thereto an open-work material made up of threads of non-feltable fibers by causing feltable fibers individually to embrace a thread of said material and felting the ends of said embracing fibers into the felt.

7. The herein described art which consists in forming a layer-like base of feltable fibers, hardening the said base, relating thereto a loosely woven material, and completing the felting together of the fibers of said base and looping fibers of the latter over threads of said material and felting the ends of the looping fibers into the base.

8. The herein described art which consists in forming a layer-like base of feltable fibers, subjecting said base to hardening action, then, relating thereto a loosely woven material having interstices between the threads thereof, and subjecting the thus assembled base and material to pressure in the direction of the thickness of the material and to a vibratory-like movement in a direction transversely of the thickness thereof to cause fibers projecting from said base to extend over the threads of said material and to have their otherwise free ends interfelted with other fibers of said base.

9. The herein described art which consists in forming a layer-like base of feltable fibers, relating thereto a loosely woven material having interstices between the threads thereof and having a different response to a dye than said feltable fibers, felting the fibers of said base together, looping certain fibers of said base over the threads of said material and felting the otherwise free ends thereof into the felt base, and dyeing the resultant composite fabric.

10. The herein described art which consists in forming a layer-like base of feltable fibers, dyeing said base to a certain color, applying thereto a loosely woven material having interstices between the threads thereof and having a color different from that of said base, felting the fibers of said base together and certain of the fibers thereof over the threads of said material and into said base.

11. The herein described art which consists in forming a layer-like base of feltable fibers, partially hardening said base, relating thereto a loosely woven material, and felting the fibers of said base together and causing certain of the fibers of said base to loop over portions of said material and felting their ends into the base, thereby to secure said material thereto.

12. The herein described art which consists in forming a layer-like base of feltable fibers, partially hardening said base, applying thereto a loosely woven material, and subjecting the thus assembled base and material to heat, pressure, moisture and kneading action to felt the fibers of said base together and to cause certain of said fibers to bridge over portions of said material and to cause the ends of said bridging fibers to interfelt with other fibers of said base.

13. The herein-described art which consists in forming a layer-like base of feltable fibers, subjecting said base to hardening action, relating thereto an open-work material whose threads are made of fibers incapable of felting with said feltable fibers, felting the fibers of said base together and causing certain fibers of the base to extend over threads of said material and to become interfelted at their otherwise free ends with other fibers of said base, thereby to secure said material and said base together, and controlling the number of securing fibers made available by said base by substantially correspondingly increasing or decreasing the extent of the hardening to which said base is subjected during this hardening.

14. The herein described art which consists in forming a layer-like base of feltable fibers, partially hardening said base, applying thereto a loosely woven material made of fibers incapable of interfelting with said feltable fibers, interfelting the fibers of said base and causing certain of the fibers thereof to directly secure said material to said base, and shrinking the felt base.

15. The herein described art which consists in forming a layer-like base of feltable fibers, partially hardening said base, applying thereto a loosely woven material made of fibers incapable of interfelting with said feltable fibers, interfelting the fibers of said base and causing certain of the fibers thereof to directly secure said material to said base, completing the hardening of said felt base, and shrinking the latter.

16. The herein described art which consists in relating to a layer-like base of feltable fibers of one color a loosely woven material of another color and made of fibers incapable of interfelting with said feltable fibers, and treating the thus assembled base and material to cause said feltable fibers to interfelt and to directly secure said material thereto.

17. The herein described art which consists in relating to a layer-like base of feltable fibers of one color a loosely woven material of another color, felting the feltable fibers of said base together, and felting the ends of fibers into the felt base after looping the said fibers over threads of said material.

18. In a fabric, in combination, a sheet-like base of interfelted feltable fibers having superimposed thereon an open-work material made up of threads with interstices therebetween, certain fibers of said base looping over the threads of said material and having their otherwise free ends interfelted with the fibers of said base.

19. In a fabric, in combination, a sheet-like base of interfelted feltable fibers having superimposed thereon an open-work material made up of threads with interstices therebetween, the thread of said material being made of non-feltable fibers, certain of the fibers of said base directly securing said material to the latter.

20. In a fabric, in combination, a sheet-like base of interfelted feltable fibers having superimposed thereon an open-work material made up of threads with interstices therebetween, certain of the fibers of said base projecting through interstices on opposite sides of a thread in said material and being felted together.

21. In a fabric, in combination, a sheet-like base of interfelted feltable fibers having superimposed thereon an open-work material made up of threads with interstices therebetween, certain of the fibers of said felt base being looped over the threads in said material and having their otherwise free ends interfelted with the fibers in said base, and certain other fibers of said base extending through interstices in said material on opposite sides of a thread and being felted together over the thread.

22. In a fabric, in combination, a felt base of one color having secured thereto by the fibers of said base an open-work material, the threads of which are made of non-feltable fiber, and having a different color.

23. In a fabric, in combination, a felt base susceptible to one class of dyes and resistant to another class of dyes and having secured thereto by fibers of said base a woven open-work material susceptible to said other class of dyes and resistant to said first-mentioned class of dyes, the securing fibers of said base bridging over threads of said material.

24. The herein-described art which consists in forming a base of feltable fibers, subjecting said base to hardening action, relating thereto an open-work material made of threads whose fibers are incapable of interfelting with the feltable fibers of said base, completing the felting together of the fibers of said base and looping fibers of the latter over threads of said material and interfelting the ends of the looping fibers with other fibers of said base, and controlling the number of fibers of the base that are made available for looping by correspondingly varying the extent to which said base is subjected to said hardening action.

25. In a fabric, in combination, a felt base made of interfelted animal fibers having secured thereto by said fibers an open-work material made of non-felting fibers.

26. In a fabric, in combination, a felt base made of interfelted animal fibers having an ornamental open-work material made of fibers lacking interfelting qualities and secured thereto by fibers of said base.

27. In a fabric, in combination, a felt base made of interfelted animal fibers having secured thereto by fibers of said base an open-work material, the threads of which are made of non-animal fibers.

28. In a fabric, in combination, a felt base made of interfelted animal fibers having secured thereto by said fibers, an open-work material of silk.

29. In a fabric, in combination, a felt base made of interfelted animal fibers having secured thereto by said fibers, a loosely woven material, the threads of which are made of vegetable fiber.

30. In a fabric, in combination, a felt base made of interfelted animal fibers having secured thereto by said fibers, a loosely woven material, the threads of which are made of rayon.

31. In a fabric, in combination, a base material having superimposed thereon an open-work material made up of threads, and fibers having both ends thereof anchored in said base material for directly securing said superimposed material thereto.

32. In a fabric, in combination, a base material made of interfelted fibers and having superimposed thereon an open-work material made up of threads, and feltable fibers looped over threads of said superimposed material and having the ends thereof interfelted with the fibers of said base material.

In testimony whereof, I have signed my name to this specification this 10th day of March, 1931.

FRANK H. LEE.